Nov. 1, 1949.                    H. B. REX                    2,486,435
                        ALTERNATING CURRENT MOTOR CONTROL
Filed June 21, 1946                                    3 Sheets-Sheet 1
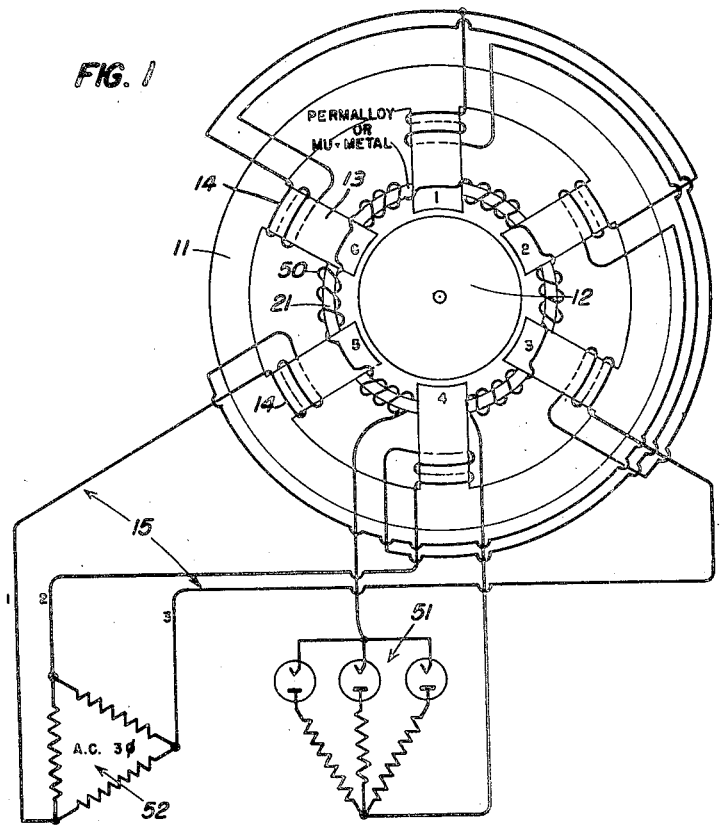
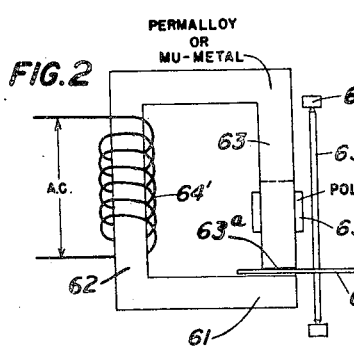
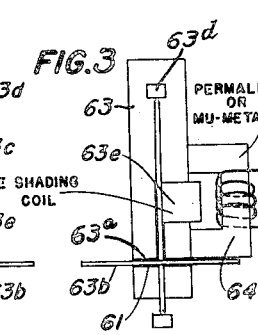
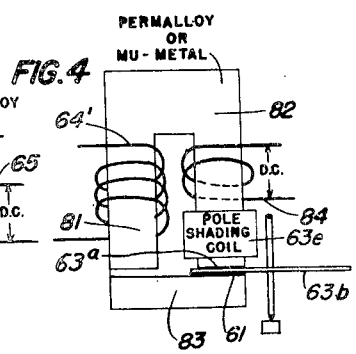
INVENTOR
HAROLD B. REX
BY
ATTORNEY

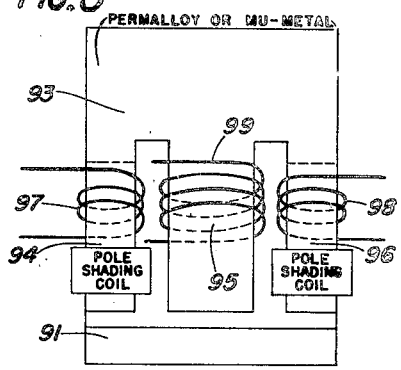
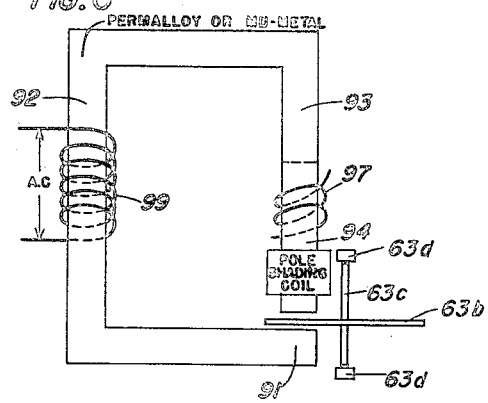
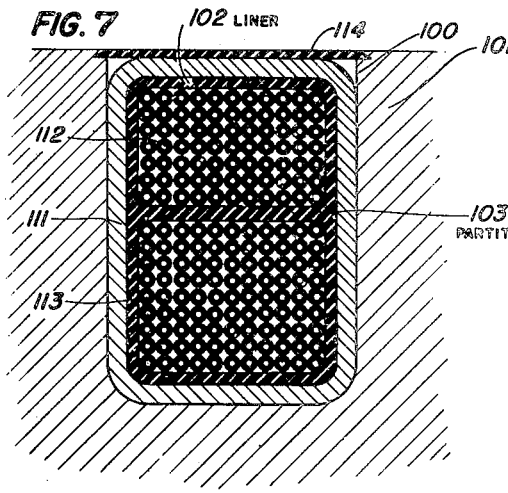
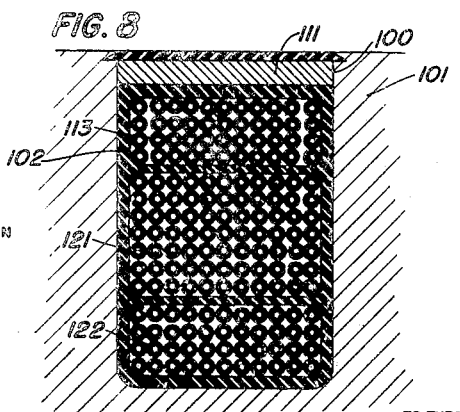
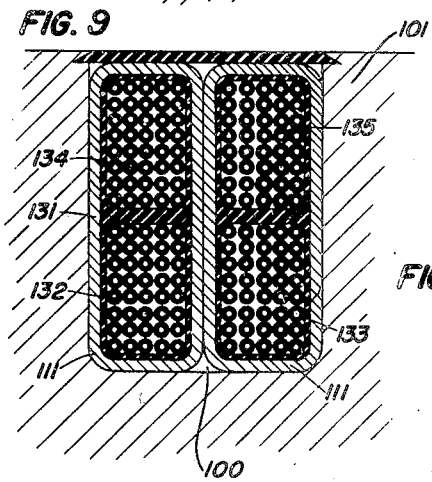
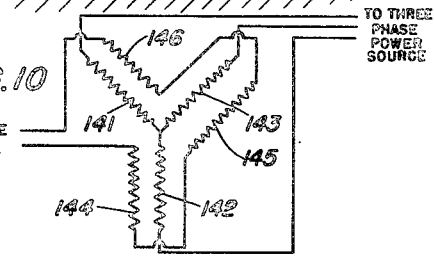
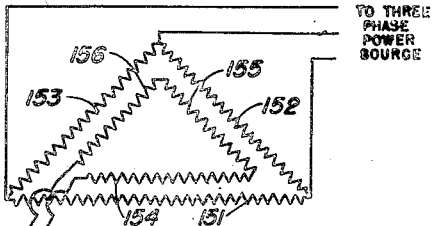
INVENTOR
HAROLD B. REX Nov. 1, 1949.  H. B. REX  2,486,435
ALTERNATING CURRENT MOTOR CONTROL
Filed June 21, 1946  3 Sheets-Sheet 3
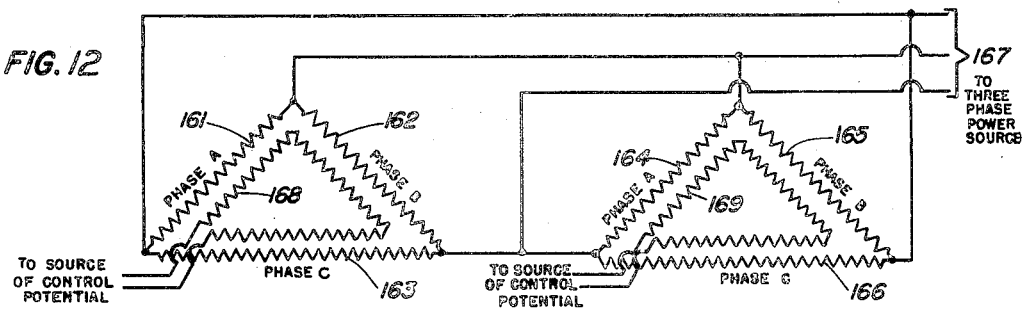
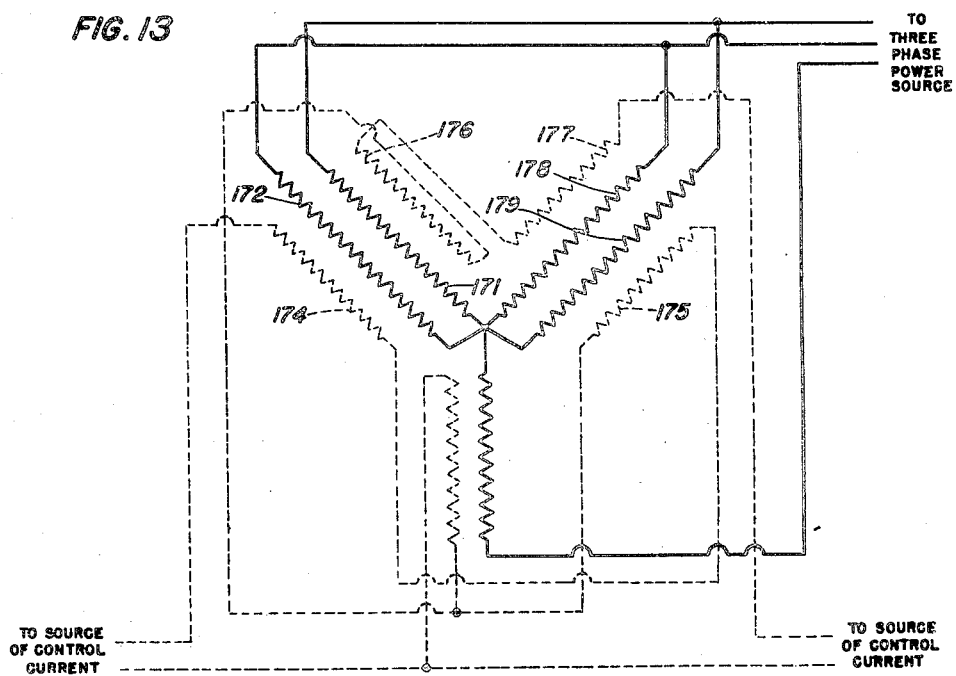
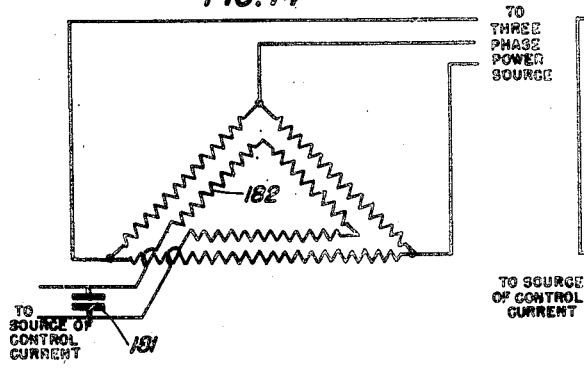
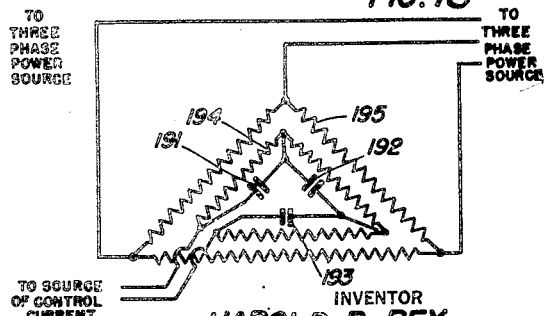
INVENTOR
HAROLD B. REX
BY
ATTORNEY Patented Nov. 1, 1949

2,486,435

UNITED STATES PATENT OFFICE 2,486,435

ALTERNATING CURRENT MOTOR CONTROL

Harold B. Rex, Falls Church, Va.

Application June 21, 1946, Serial No. 678,183

2 Claims. (Cl. 172—120)

(Granted under the act of March 3, 1883, as amended April 30, 1928; 370 O. G. 757)

This invention relates to electromagnetic devices and more particularly to an electromagnetic device that employs a saturable magnetic shunt to control the magnetic field.

A principal object of the invention is the provision of a novel type of polyphase induction motor wherein a regulatable magnetic shunt is utilized to control the field flux as impressed upon the armature.

Another object of this invention is the provision of an induction motor the speed of which is variable by means of a regulatable magnetic shunt.

Another object of the invention is the provision of a servo-motor having a large factor of amplification.

A further object of the invention is the provision of an induction motor the speed of which is substantially instantaneously responsive to variations in the field current.

Another object of the invention is the provision of an induction motor the speed of which is readily controllable or reversible.

Another object is the provision of a novel type of regenerative motor.

A further object of this invention is the provision of a relay that by the application of a small amount of power can regulate a much larger amount of power while at the same time reducing or eliminating surges in the relay.

Still another object of the invention is the provision of a generator or motor utilizing a magnetically saturable element in the field winding.

Still another object of the invention is the utilization of a controlled saturable magnetic shunt to provide pole shading in variable speed reversible motors of the induction or hysteresis type.

A further object of the invention is the provision of an induction motor utilizing a saturable magnetic shunt in the field, in which the alternating current induced in a control winding is rectified to provide direct current for the purposes of control.

Other objects will appear to those skilled in the art from a reading of the following specification.

In carrying out the invention an induction motor is provided with a highly permeable magnetic shunt from one pole of the stator to another pole. If then the winding of the stator is excited by electric current, the magnetic flux produced thereby will pass through the magnetic shunt, rather than across the air gap between the pole faces and through the armature. Consequently, the rotor will not rotate because there will be no current induced in the armature. If the shunt is rendered inoperative, all the field flux will pass through the armature and act to rotate the rotor. It will be seen, therefore, that by varying the amount of field flux that is allowed to be bypassed through the shunt, the speed of the rotor may be controlled. The shunt, consequently, may be made to function as a valve to regulate the speed of the induction motor.

To carry out this method of control, advantage is taken of the fact that certain materials may be made to saturate magnetically at relatively low values of magnetomotive force. It is also essential that they have a high initial permeability. Among the materials that meet these tests are "Permalloy," "Mumetal," nickel-iron alloy including substantially 47 percent nickel, certain other alloys of iron, silicon, and aluminum, and also pure iron.

In accordance with the principles of the invention, a magnetic shunt constructed of such a material is positioned between the adjacent poles of the stator or otherwise arranged to provide a magnetic path that causes sufficient induced back electromotive force to exist in the field winding so as to permit only a small line current to flow. If now the magnetic shunt is magnetically saturated by the use of an independent direct current, the main alternating flux induced by the field winding of the stator cannot go through the shunt. The field flux is consequently forced to traverse the air gap outside the magnetic shunt and thereby reach the armature and cause rotation of the rotor. The value of current in the shunt may be varied to control the degree of saturation and therefore the proportion of field flux that may traverse the shunt.

Because the permeability of materials like "Permalloy" and "Mumetal" decreases rapidly with increase of magnetomotive force, and because the direct current through the saturating winding of the shunt is limited only by the resistance of the winding, this method of control provides considerable amplifying action. Consequently, a small amount of direct current or power may be used to control a much larger amount of alternating current or power in the production of motor torque.

Instead of using a magnetic shunt made of the highly permeable materials hereinbefore mentioned, the invention contemplates the use of a control winding on the stator pole itself. In such event, the control winding when excited by direct current will control the permeability of the pole, and as a result regulate the number of lines of magnetic flux that may pass through it from the alternating field current. In this case the A. C. winding on the permeable core constitutes an inductive reactance, and the D. C. winding constitutes the means for controlling the saturation. It is understood that the inductance in the A. C. winding presents an impedance to the flow of A. C. When, however, the reactor is deliberately saturated by the flow of D. C. in the D. C. winding, the magnetic effect of the A. C. is driven, as it were, outside the core, and the inductance effect in the core is reduced. Consequently a much greater A. C. is permitted to flow in the A. C. winding. Once the D. C. has built up to its full value, the losses in the D. C. circuit are only slightly more than the resistance heat losses, and it is consequently possible for a small amount of D. C. energy to control many hundreds of times as much energy in the A. C. winding.

The invention will be described more particularly with the aid of the accompanying drawings. In these drawings:

Fig. 1 shows an induction motor that includes a saturable magnetic shunt for controlling the torque.

Fig. 2 shows schematically a controlled saturable magnetic shunt that may be used for pole shading to obtain variable speed.

Fig. 3 is a side view of the shunt shown in Fig. 2.

Fig. 4 shows another form of magnetic shunt used for pole shading.

Fig. 5 is still another form of magnetic shunt for obtaining variable speed and reversible motion.

Fig. 6 is a side view of the device shown in Fig. 5.

Fig. 7 represents a schematic arrangement of one type of saturable magnetic shunt employing the principles of the invention to a distributed winding.

Fig. 8 is a schematic arrangement of another form of saturable magnetic shunt using two power windings.

Fig. 9 shows a shunt provided with means for obtaining reversible rotation.

Fig. 10 is a wiring diagram for a Y-connected, non-reversible, variable speed, three-phase motor.

Fig. 11 is a similar diagram for a delta connection.

Fig. 12 is a wiring diagram for a reversible motor.

Fig. 13 is another wiring diagram for a reversible, variable speed, three-phase motor.

Fig. 14 is a wiring diagram utilizing a resonant alternating current in the control winding.

Fig. 15 is another arrangement of utilizing a resonant alternating current in the control winding.

The conventional three-phase induction motor is shown in Fig. 1. In general, the motor comprises a stator 11 and a rotor 12. As portrayed here the stator is shown with six salient poles 13. A coil 14 is wound around each pole, and the coils are suitably connected in series and energized by a source of three-phase alternating current 15. The rotor 12 has the usual short-circuited conductors running longitudinally thereof in slots. When the coils 14 are energized, a magnetic field is set up between opposing poles 13, and due to the nature of the three-phase alternating current, this field will revolve about the axis of the stator 11. The rotating magnetic field will induce a magnetic field in the conductors of the rotor 12, and the induced magnetic field will tend to oppose that of the field windings 14. As a result, the rotor 12 will rotate. The direction of rotation is determined by the nature of the connections of the field windings 13 and the phase sequence of the applied alternating current 15. The speed of rotation will be commensurate with the frequency of the alternating current 15 applied to the field, and modified by the load applied to the rotor 12. It will be observed that the poles 13 are so spaced and positioned that the magnetic field produced by the field coils 14 surrounding them must traverse the gaps between adjacent poles, so that the lines of force will be in the path of the longitudinal conductors in the rotor 12. It is desirable to present as many lines of force as possible to the movement of the conductors in the rotor 12 in order to impart the maximum turning torque to the rotor.

The usual material used for the pole pieces is silicon steel. One of the characteristics of this material is that it does not readily saturate at low values of magnetomotive force.

Each pair of adjacent poles 13 is provided with a magnetic shunt 21. Each shunt is made of a high permeability, low hysteresis material. Examples of such material are "Permalloy" and "Mumetal." In form these shunts comprise straight or arcuate ridges between adjacent poles 13. As a result, when the field windings 14 of the stator 11 are energized by the three-phase alternating current 15, the magnetic flux induced in the stator 11 will pass through the magnetic shunts 21, rather than across the air gap between the poles 13 and through the rotor conductors. It will, of course, be apparent that the opposition to the magnetic flux will be less in the magnetic shunt than it will be in the air gap. If the shunt is complete, that is, if all the magnetic flux passes through the shunt and none through the rotor 12, the conductors in the rotor will not cut any lines of force, and the rotor will not rotate.

If now a means is provided so that the effect of the magnetic shunt can be regulated, the alternating flux passing through the rotor 12 can be varied to cause rotation of the latter at any desired speed. This may be accomplished by utilizing the fact that Permalloy and Mumetal may be made to saturate at relatively low values of magnetomotive force. Consequently if the shunt is saturated by the use of a steady magnetic flux, the main alternating flux originating in the field windings 14 is thereby forced to traverse the air gap and link the rotor 12 and cause rotation thereof in the conventional manner.

As shown in Fig. 1 a coil 50 is wound about each magnetic shunt 21. This winding 50 is connected with a source of direct current 51. When the windings 50 are energized to such an extent that the magnetic flux induced thereby completely saturates the magnetic shunts 21, none of the magnetic flux induced by the alternating current 15 in the field windings 14 of the stator 11 will have available a path through the said magnetic shunts 21. Consequently, all of the magnetic flux induced by the field windings 14 will pass through the conductors of the rotor 12 as hereinbefore described, and the rotor 12 will operate as in the conventional three-phase induction motor. If the windings 50 are not energized, all the magnetic flux induced by the field windings 14 will pass through the magnetic shunts 21, and there will be no force tending to rotate the rotor 12. Consequently, the amount of current 51 passing through the windings 50 will determine the turning torque and the speed of the rotor 12. Because of the fact that the material of which the magnetic shunts between the pole pieces are made is easily saturable at low values of magnetomotive force, a small amount of direct current 51 in the coils 50 will be adequate to provide a large measure of control over the turning torque of the rotor 12. If desired, the windings 50 may be energized by alternating current instead of or in addition to direct current.

It is often desirable to provide means for reversing rotation of the rotor 12. Such reversal of rotation may be effected by combining two separate motors that are coupled mechanically, or by combining two stators with two rotors on a common shaft or with a common rotor. Each stator may be connected with the three-phase source of power 15 in such a manner as to give opposite rotation to the other stator and each stator may be provided with its own control circuit. Consequently, one control circuit will provide one direction of rotation, and the other control circuit will give the opposite rotation. If desired, the two stators may be combined in one magnetic structure if two separate magnetic circuits are provided, each for shunting the field flux as hereinbefore described. Of course, each magnetic shunt circuit will have its own control winding. Thus, if one set of shunts is saturated, the rotor will have clockwise rotation; if the other set of shunts is saturated, the rotor will have counterclockwise rotation. The structures thus contemplated are believed to be easily visualized in the light of the foregoing disclosure without any specific additional illustration.

It is understood that these methods of control may be applied to single-phase, double-phase and higher-phase motors, as well as to three-phase motors. It is necessary and sufficient that a shunt magnetic circuit be provided for each pair of poles and that a means be provided for saturating this shunt circuit.

Another method of controlling the path of the magnetic flux is illustrated in Figs. 2 and 3. Each magnetic circuit consists of core legs 61, 62, 63 with an air gap 63a in which a rotor 63b is free to move, being carried by a shaft 63c rotatable in bearings 63d. A field coil 64', wound about the leg 62, is adapted to be energized by alternating current to provide the equivalent of a rotating magnetic field by means of the pole shading coil 63e, a method which is well known in the art. In this construction a magnetic shunt 64 (Fig. 3) bridges that portion of leg 63 which carries the pole shading coil 63e, and a control winding 65 is wound about the shunt 64. Direct current is adapted to energize this winding 65 for the purposes of varying the saturation of the shunt 64. Variation of the saturation of the magnetic shunt 64 will regulate the flux flow through the shading coil, and thereby the speed of the rotor may be controlled. This type of control is called pole shading. As before, both of the arms 62 and 63 of the pole are made of silicon steel, whereas the shunt 64 is made of easily saturable magnetic material like Permalloy or Mumetal.

In Fig. 4 the entire magnetic pole structure is made of the easily saturable magnetic material and comprises two parallel arms 81 and 82 both of which are spaced from the pole face 83. Here again, a control winding 84 serves to control the number of lines of force passing through the arm 82 and consequently through the arm 81, to regulate the flux leading to the rotor 63b.

In Figs. 5 and 6, the pole structure comprises a pole face 91 and two arms 92 and 93 all constructed of the saturable material heretofore mentioned. The second arm 93 terminates in three branches 94, 95, and 96 (Fig. 5), all of them spaced from the pole face 91. The outside branches 94 and 96 are each wound with a separate control winding 97 and 98, respectively, to control the number of lines of force traversing the said branches 94 and 96 and consequently the third branch 95 also. The main field is produced by an A. C. winding 99 on the arm 92. With this construction the device is operable to reverse direction of the rotor 63b and to vary the speed in either direction.

In salient-pole motors the turns for exciting each field coil are concentrated in a single winding on the pole, whereas in non-salient-pole motors the exciting turns are distributed over the surface of the stator. A method of employing saturable elements for control of alternating current motors using distributed windings is shown in Fig. 7. The non-salient field pole comprises a slot casing 111 fitted into a slot 100 in the face of the stator 101. The slot casing 111 is constructed of the highly permeable, saturable magnetic material hereinbefore mentioned, and is of higher magnetic permeability than the main stator core structure 101, the purpose thereof being to carry the flux which provides the back-electromotive force in the field windings without carrying the flux to the rotor. In this respect the casing serves both as a reactor core and a shunt. It serves as a reactor core for the main field windings by increasing the reactive impedance of these windings; and serves as a shunt since it provides a low reluctance path for the flux linking the coil sides in any slot and shunts this flux from the path including the stator teeth, air gap and rotor. It is the further intention that when rotation is desired, this higher permeable material will be saturated by passage of the direct control current through the saturating winding within the same casing, thereby causing flux to flow across the air gap to the rotor to provide a back-electromotive force induced in the winding. A main field coil 112 emplaced in a liner 102 of insulating material in said slot casing obtains power from an alternating current power source, and a control winding 113 occupying a space in said liner below a partition 103 therein is energized by a source of current, preferably D. C., for controlling the permeability of the magnetic casing 111 and consequently the linkage between the pole and the rotor. If desired, the windings 112 and 113 may be interchanged. The slot may be closed or semi-closed by a wedge 114 of nonmagnetic material. When the control winding 113 is not energized, the magnetic casing 111 is unsaturated, and the magnetic flux due to the field winding 112 links the pole to the rotor. It is obvious that the combination of the magnetic casing 111 and the control winding 113 provides a highly permeable (or low-reluctance) path when it is unsaturated, and that little or no flux can link the rotor because of the higher reluctance of this path to the rotor. On the other hand, when the magnetic casing 111 is saturated, due to the application of direct current, or alternating current, or both simultaneously, to the control winding 113, the permeability of the casing 111 decreases, or in other words, the reluctance increases, until most of the magnetic flux may be made to link the rotor and thus cause motor action in the conventional manner.

It will be understood that more than one field coil 112 may be employed within each slot casing 111. In such event, however, only one control winding 113 is necessary for each casing 111. This is illustrated in Fig. 8, wherein one control winding 113 is used in combination with two field coils 121 and 122.

A pair of the slot casings 111 contains two separate control circuits as illustrated in Fig. 9. In this form of the invention, there are two power or field coils 132 and 133 and two control windings 134 and 135, one main field coil side and one control winding in each of the casings. The control winding 134 controls the magnetic field for the flux to rotate the rotor in one direction, and the control winding 135 controls a similar field for rotation in the opposite direction.

In any arrangement, the field or power windings may be connected in any of the conventional forms. If three-phase is used, they may be connected in Y or delta. Each control winding must be connected in series; that is, all of the control windings used for rotation in one direction are connected in series, and all the control windings used for opposite rotation are similarly connected in series. This permits the neutralization of any induced alternating current in the control winding that would otherwise exist because of induction from the power winding. The alternating voltages induced by the power winding may thus simply be balanced out in the control windings, or they may be used with rectifiers in any suitable manner. Fig. 10 shows an arrangement wherein the field or power windings 141, 142, and 143 are energized from a three-phase power source and are connected in Y arrangement. The control windings 144, 145, and 146 are connected in series as shown. Of course, in this form of the invention, the rotor is non-reversible.

In Fig. 11 the power windings 151, 152, and 153 are connected in delta. The control windings 154, 155, and 156 are here, too, connected in series, and again the motor is non-reversible.

One method of obtaining reversible direction of rotation is shown in Fig. 12. Two sets of polyphase field windings 161, 162, and 163, and 164, 165, and 166 are arranged as shown in Fig. 9 and supplied from an A. C. source 167. While the windings are shown as connected in delta, it is obvious that they may be also connected in Y. Within each set of field windings is a control winding 168 or 169, each connected to a separate source of control potential.

It is also possible, as shown in Fig. 13, to combine both field windings 171 and 172 on one phase. Here again, two control windings 174 and 175, supplied by two sources of control current, permit reversible rotation of the motor. The windings in Fig. 13 are intended to be housed in stator slots according to the showing, for example, in Fig. 9. In such a case the winding 172 (Fig. 13) would be represented by the winding 135 (Fig. 9), the saturating winding 176 by 132, and winding 174 by 133. Analogous relations would exist in the other phase represented by 175, 177, 178 and 179.

The principle of ferro-resonance, or variable permeability in approaching resonance, may be applied to increase the amplifying effect of the control winding. With the control winding connected in open delta, the only inductance of the control winding is that due to the leakage flux. When control current, either direct or alternating, in sufficient magnitude is applied to the control winding, this inductance is decreased. If a capacitor is connected across the terminals of the control winding to tune it so that it is resonant at a certain frequency, and an alternating electromotive force is superimposed on the signal potential of the control source so that this A. C. potential is somewhat greater than the resonant frequency of the tuned circuit, the reduction of the inductance due to saturating the shunt magnetic path will raise the natural resonant frequency of the control circuit so that the resonant alternating current flowing in the circuit will cause further saturation in the magnetic material and give increased control action. Such a capacitor 181 is shown in Fig. 14 as connected across the terminals of the open delta control winding 182 that is energized by a voltage that includes alternating voltage.

Another method of achieving the same result is shown in Fig. 15, wherein three capacitors 191, 192, and 193 are connected across each phase of the control winding 194. In thus employing resonance to obtain increased control, the inductance of the control winding 194 is decreased with increased saturation of the material in the magnetic shunt. By tuning each phase of the control winding 194 with the capacitor 191, 192, or 193 so that the circuits resonate at a frequency less than the frequency of the alternating current in the field coil 195, a condition may be obtained where an increase in the control voltage that partially saturates the magnetic shunt will cause a decrease in inductance of the control winding 194. This will raise the natural frequency of the control winding 194 and cause it to approach the frequency of the power supply voltage. Alternating current will thereby flow in the control winding and further saturate the magnetic shunt.

The process may be made cummulative to give great amplification; depending on the parameters of the circuits, it is possible to obtain infinite amplification, and consequent instability of control. This is similar to oscillation or spilling over of a vacuum tube caused by feedback. If this occurs, conventional methods of control by degenerative feedback may be employed to regain stability. The required degenerative control circuit currents may be obtained by rectification of the alternating potentials or currents in the power windings, or by rectification of those induced in the several phases of the control windings, or from any other source as required. These rectified currents may be further integrated or differentiated by appropriate circuits after the manner of present servo-mechanism practice, to provide anticipatory functioning of the motor for servo-motor use or operation in accordance with any desired pattern. Another method of control is by the use of regenerative feedback circuits.

The methods above described are not limited to use in motors, but may also be applied to the generation of power. Thus, if instead of a squirrel-cage rotor, a driven rotating steady field is employed in the stator above described, the apparatus becomes an alternating current generator in which the magnitude of the generated electromotive force may be controlled so as to be capable of rapid change in voltage. Rectified currents obtained from the alternator output may be employed in the control winding to maintain constant voltage or current. If desired direct current may be used to provide output potential, current, or power, according to any desired pattern or relation, by using circuits analogous that of the conventional negative feedback amplifier, such as the cathode follower, but utilizing currents instead of potentials.

It will be apparent that the use of the saturable reactor will provide tremendous amplification of any desired voltage or current. The control, of course, is substantially instantaneous. In this it resembles a vacuum tube or valve, the advantage being that this method may be utilized for the control of motors and other apparatus using large amounts of power.

The invention described herein may be manufactured and used by or for the Government of the United States of America for governmental purposes without the payment of any royalties thereon or therefor.

I claim:

1. In an electromagnetic device, a stator and a rotor, said stator having a slotted pole face confrontable by said rotor rotatable therein, windings in said slots for establishing a rotating field, a casing containing the windings in each slot, said casing being composed of highly permeable magnetic material and of higher permeability than the stator and constituting a bypass for the rotating field flux, a control winding having coil sides pocketed in said slot casings, said winding being variably energizable by direct current independently of the main field coils to variably magnetically augment the local fields in said casing to the point of saturation, thereby controlling the extent of the field flux linkage between the stator and rotor.

2. In an electromegnetic device, a stator and a rotor, said stator having a slotted pole face confrontable by said rotor rotatable therein, separate field windings in said slots for establishing oppositely rotating fields, a pair of slot casings in each slot, each slot casing being composed of magnetic material of higher permeability than the stator and constituting a bypass for the flux of said field, said separate field windings occupying parts of a respective one of said pairs of slot casings, and means for controlling the bypassing of the field flux to control the speed of rotation of the rotor, said means comprising separate control windings having coil sides occupying the remaining parts of the respective slot casings, said windings being individually energizable by direct current to increasingly impress a control flux upon the concomitant slot casings.

HAROLD B. REX.

REFERENCES CITED

The following references are of record in the file of this patent:

UNITED STATES PATENTS

| Number | Name | Date |
| --- | --- | --- |
| 925,499 | Parsons et al. | June 22, 1909 |
| 978,638 | Parsons et al. | Dec. 13, 1910 |
| 1,027,422 | Kicklighter | May 28, 1912 |
| 1,177,788 | Martin | Apr. 4, 1916 |
| 1,500,834 | Macmillan | July 8, 1924 |
| 1,736,618 | Nickle | Nov. 19, 1929 |
| 1,839,299 | Cornu | Jan. 5, 1932 |
| 2,027,846 | Suits | Jan. 14, 1936 |
| 2,039,456 | Sammarone | May 5, 1936 |
| 2,227,467 | Sweeny | Jan. 7, 1941 |
| 2,294,449 | Dickten | Sept. 1, 1942 |
| 2,306,578 | Wetzel | Dec. 29, 1942 |